INVENTORS
ERNST WEICHEL
FRIEDRICH PHILIPP

BY McIlwand Toren
ATTORNEYS

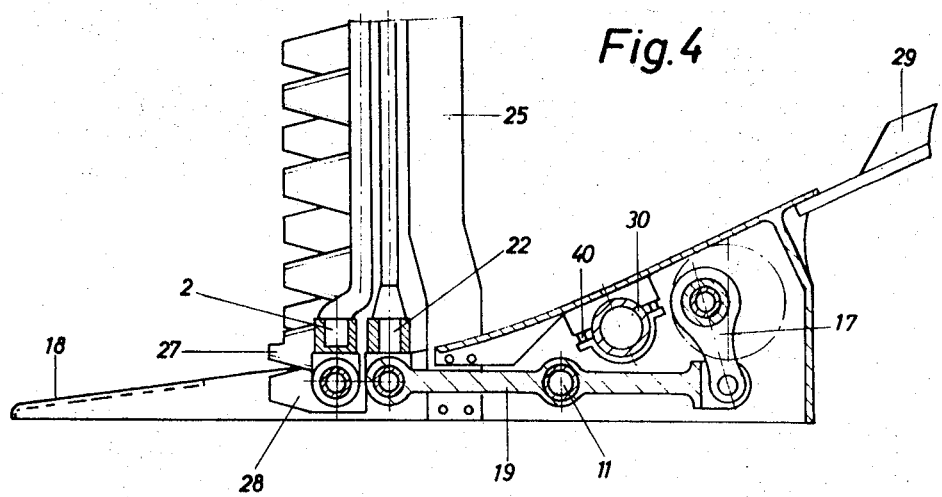
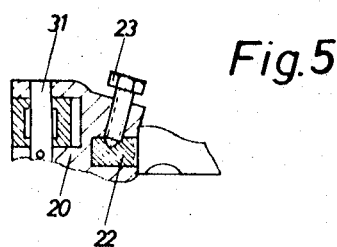
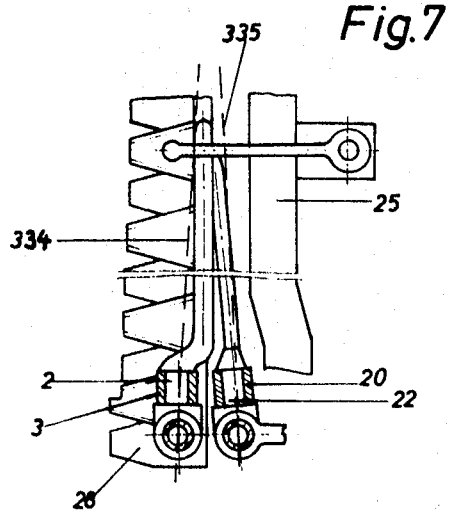
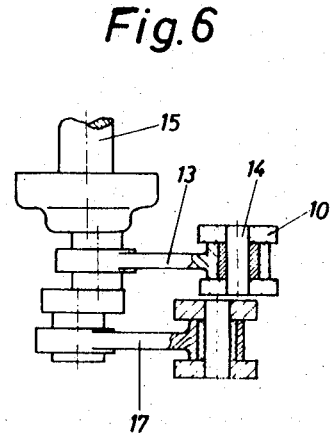
INVENTORS
ERNST WEICHEL
FRIEDRICH PHILIPP

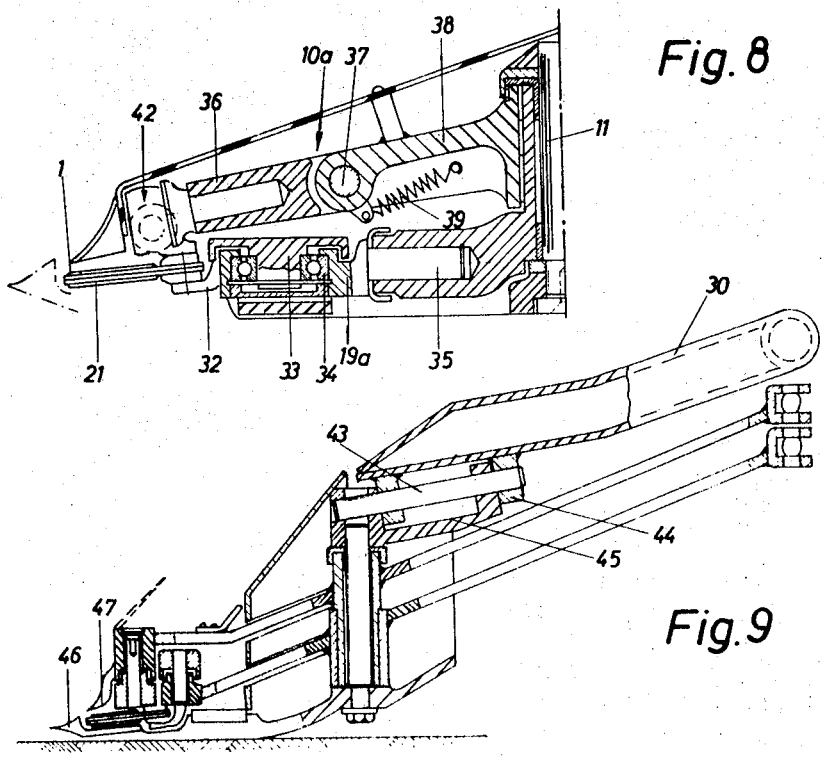
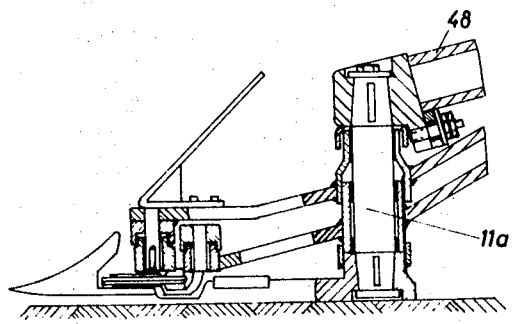
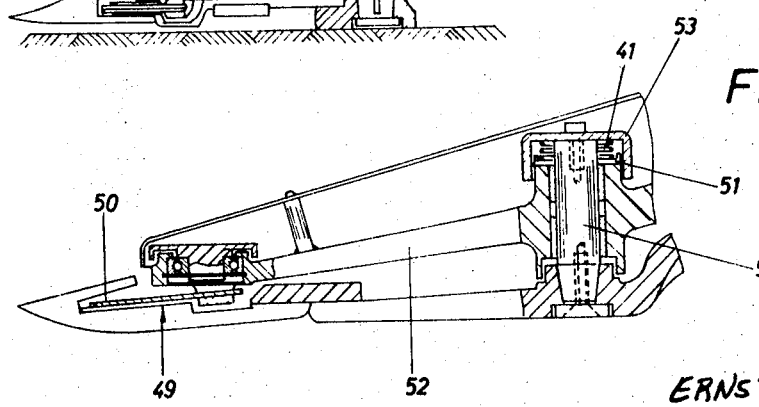
Fig. 8
Fig. 9
Fig. 10
Fig. 11

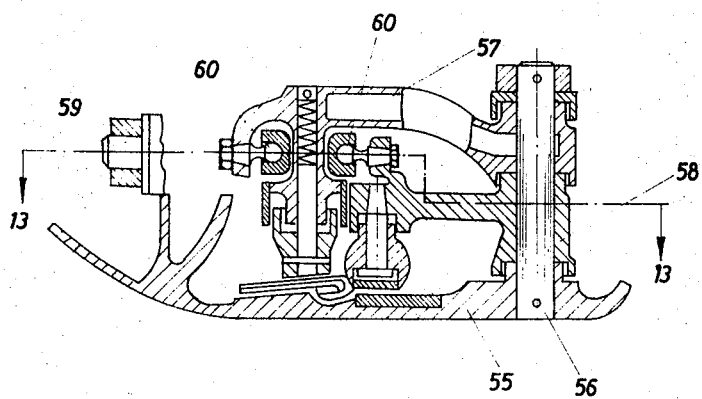
Fig. 12
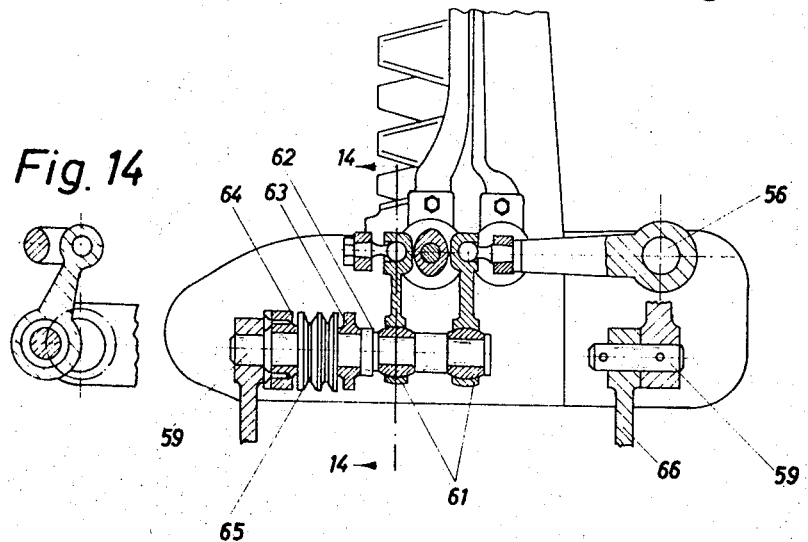
Fig. 13
Fig. 14

United States Patent Office 3,616,628
Patented Nov. 2, 1971

3,616,628
DRIVE ARRANGEMENT FOR REAPER
CUTTING APPARATUS
Ernst Weichel, 1 Bahnhofstrasse, 7326 Heiningen, Germany, and Friedrich Philipp, 26 Am Kattenbusch, 5608 Radevormwald, Germany
Filed Apr. 21, 1969, Ser. No. 817,879
Int. Cl. A01d 55/02
U.S. Cl. 56—297                                              14 Claims

ABSTRACT OF THE DISCLOSURE

In a reaper apparatus employing one or a pair of moving blades, a drive lever is secured to each moving blade and is mounted to pivot about a vertical axis for imparting a reciprocating action to the blade. Pin connections, in parallel relationship with the axis of the pivot for the lever, secure the lever to the blade and to drive means. The upper blade is resiliently held against the lower blade during operation.

SUMMARY OF THE INVENTION

The present invention is directed to a drive arrangement for a reaper apparatus and, more particularly, it is concerned with a drive lever arrangement mounted to pivot about a vertical axis with the lever pin connected at one end to a blade and at the other end to a driving means for imparting a reciprocating motion to the blade.

Known drive means, for reciprocating reaper blades of the general type mentioned above, have used drive levers which oscillate about an approximately vertical axis and with other drive parts, such as connecting rods and the like, are powered by hydraulic motors, gear transmissions, or the like. Where front reapers are used, the drive levers must have a configuration so that they do not impede the flow of the reaped material, that is, drive levers which are not flat and are located adjacent the cutting area, must be arranged behind protective shoes and the like. Where the levers are located in the cutting area, for instance, in centrally driven cutting mechanisms, they must be flat in front and rise gradually rearwardly for purposes of shaking off the material after it has been cut.

It has already been suggested to position the drive levers for either single or double blade cutter mechanisms at the lateral edges of the blades and to articulate the levers to the blades providing play in the vertical direction and in the direction of travel, for example, by means of links, drive sprockets and the like.

Drive levers have been used for centrally driven reaper apparatus, but such levers supply only a reciprocating motion and do not affect the position and play in guiding the blades or the pressure relationship between the blades or between a reciprocating blade and a back up blade.

As a rule, the articulated joints between a drive lever and a reaper blade are in the form of open hinge arrangements and, as a result, are subjected to increased wear during reaping causing the joints to deflect. The deflection of the joints leads to increased stressing, blade rupture, and other disadvantages. In this type of connection the blades may move apart so that the quality of the cutting action is reduced and constant blocking occurs. Another problem which has been experienced with this type of connection has been the poor guidance of the blades due to the inadequate space available, and this deficiency is particularly serious because proper blade guidance is lacking at the point where it is most necessary. When the blade guides are located as close as possible to the drive levers there has been the problem that the close arrangement impedes the flow of the reaped material.

Another disadvantage in this type of arrangement has been the torque, which develops because the reaper blades and the drive levers cannot engage along the lines of the center of gravity of the blades. Where the connection is not controlled properly, additional loading and frictional torques are developed which have reduced the effective life of the known arrangements.

Accordingly, it is the primary object of the present invention to connect each of the reciprocating blades of a reaper apparatus to a drive lever in such a manner that the disadvantages experienced in the previously known designs are avoided.

Another object of the invention is to arrange the drive lever so that it pivots about a vertical axis and it is pin connected to the reaper blade and to the drive means about axes disposed in parallel relationship with the vertical axis.

Still another object of the invention is to resiliently mount the connection between the drive lever and the reaper blade so that the cutting blades are resiliently pressed together.

Yet another object of the invention is to provide an arrangement for operating the blades without permitting the reaped material to clog or otherwise interfere with the reaping operation.

Therefore, in accordance with the present invention, at least one drive lever and the blade which it reciprocates, are secured together in a hinge-like connection which is free of play and cooperates with a bearing member to which the blade is connected. The axis of the hinge-like connection is in parallel relationship with the axis of the pivot for the drive lever. Moreover, resilient means are provided within the connection between the drive lever and the blade for pressing or urging the upper blade against a lower reciprocating or back up blade which acts as a support. Further, in accordance with the invention, a housing or shoe is provided for the drive arrangement for the blades which can be located behind the blade either at its center or at its ends.

By providing both a resilient action and play free mounting, the blades lie securely and yieldingly against each other. At the same time, wear in the blades is continuously accommodated so that the blades continue to operate with a contacting guidance over long periods of use. Since the part of the housing or shoe absorbing the drive is positioned behind and/or at the ends of the blades the axis of the pivot of rotation of the drive means may be positioned at a considerable height above the ground. This makes it possible to locate the drive means where they are not as likely to be affected by dirt.

In accordance with the present invention, to avoid the incorporation of additional guide means for the reaper blades where they are connected to the driving parts and a double reciprocating blade arrangement is used, both of the drive levers are arranged to pivot about a vertical axis. Moreover, it is also possible to connect the blades resiliently to their drive levers.

The resilient mounting of the blades can be accomplished by positioning spring means in cooperation with a connecting member securing the drive lever to a bearing member attached to the blade. Further, the drive lever may be formed of two parts joined together by a pin arranged transversely of the axis of the vertical pivot with spring means acting on the part of the drive lever adjacent the blade. Another feature of the invention is to arrange the drive means in a location where the drive lever has a limited axial displacement.

In front reapers, for adapting the blades to ground irregularities running parallel with the direction of travel, another feature of the invention is to mount the cutting device so that it can pivot about an axis extending substantially horizontally in the direction of travel of the reaper. In this arrangement, the reaper can oscillate freely by a specific amount about the axis extending in the direction of travel thus adapting to the irregularities in the ground.

In the device described above, the bearing pin for accommodating ground irregularities may form a connection between the reaper blade carrier device and the housing for the drive apparatus. With this arrangement the width of the housing containing the drive apparatus can be maintained to a minimum thereby limiting the obstruction to the flow of the reaped material.

In the case of reaper blades retained by pivotally arranged guide levers it is possible, according to the invention, to make the length of the drive lever on the blade side approximately equal to the length of the blade guide lever so that no additional bending loads are transferred to the blades. Accordingly, the blades are guided over their entire length in the same direction and in a segment of an arc.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawing:

FIG. 4 is a view, partly in section, taken along line 4—4 in FIG. 2;

FIG. 5 is a sectional view taken along line 5—5 in FIG. 2;

FIG. 6 is a sectional view taken along line 6—6 in FIG. 2;

FIG. 7 is a plan view of another embodiment of the present invention;

FIG. 8 is a side elevational view of an alternate embodiment of a resilient drive lever in accordance with the present invention;

FIG. 9 is a side elevational view of a cutter apparatus incorporating an oscillating suspension in accordance with the present invention;

FIG. 10 is a partial side elevational view of still another embodiment of the present invention;

FIG. 11 is a side view, partly in section, showing an alternate resilient mounting for a drive lever in accordance with the present invention;

FIG. 12 is a side elevational view through the drive lever of a double blade cutter apparatus, in accordance with the present invention, with crank levers located on the blade side of the drive lever;

FIG. 13 is a plan view, partly in section, taken along 13—13 in FIG. 12; and

FIG. 14 is a partial sectional view taken along line 14—14 in FIG. 13.

DETAILED DESCRIPTION OF THE INVENTION

Figure 1:
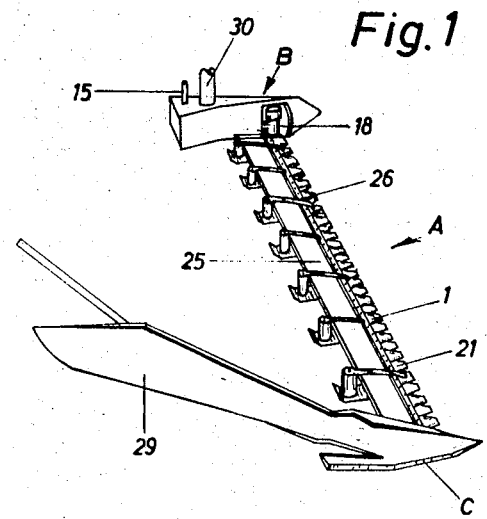
FIG. 1 is a perspective view of a reaper apparatus embodying the present invention.

In FIG. 1, a reaper apparatus A is composed of a double blade cutter mechanism having an upper blade 1 and a lower blade 21. The blades 1 and 21 are arranged to reciprocate in opposite directions in a blade beam having housings or shoes B and C at the opposite ends of the beam. The drive means for reciprocating the blades is located within the housing B. Extending rearwardly from the shoe C is a swath deflector 29. Further, as can be seen in FIG. 4, the shoe B also has a swath deflector 29.

The reaper apparatus A can be mounted on various known support means, such as a tractor, not illustrated, with the support connection being effected by means of a pipe member 30 as shown in FIGS. 1, 2, 4 and 9.

Figure 3:
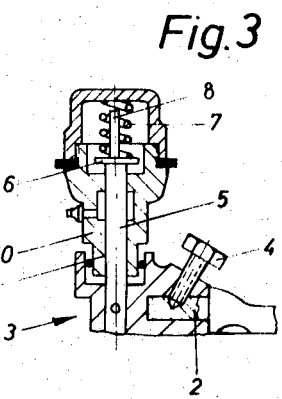
FIG. 3 is a sectional view taken along line 3—3 in FIG. 2.
Figure 2:
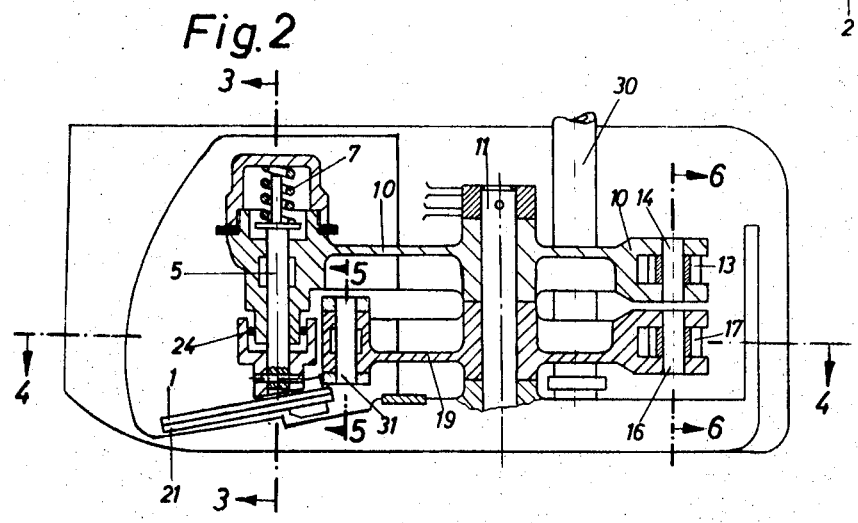
FIG. 2 is a side elevational view, partly in section, of a reaper drive arrangement in accordance with the present invention.

In FIGS. 2 and 3, the upper blade 1 of the double blade cutter mechanism is inserted into a bearing piece 3 by means of a blade head 2 and is held in place by means of an adjusting bolt 4. A pin 5 is fixed to the bearing piece 3, and the pin may be formed integral with the bearing piece or pressed into it. At its upper end above the bearing piece 3, the pin has a shoulder 6 against which a spring 7 acts. A rod-like extension 8 extends upwardly from the shoulder 6 and serves as a guide for the spring 7. Pin 5 is positioned in a bore 9 within a drive lever 10 and the pin is axially displaceable to a limited extent within the bore. Further, a clearance is provided between the pin 5 and the bore which permits the pivotal action for reciprocating the blade. However, the hinge-like connection provided by this structure is free of play. At the upper end of the housing formed by the drive lever 10 the spring 7 acts against the housing at one end and against the shoulder 6 at the other end to provide a constant downward pressure against the pin 5, and, in turn, against the upper blade 1.

The spring 7 is sized to ensure the necessary pressure for urging the upper blade 1 downwardly against the lower blade 21 within the drive shoe. This pressure is adjusted in the range of between 8 and 16 kg. The pressure of spring 7 can be adjusted by forming shoulder 6 as a combination adjustable nut with a lock nut.

The joint between the bearing member 3 and the drive lever 10 can be sealed with an O-ring 24 as indicated in FIG. 2.

Drive lever 10 is arranged to pivot about a vertically arranged pin member 11 fixed within the drive shoe B. On the opposite side of the pin member 11 from the blades, a crank arm 13 is secured to the rearward end of the drive lever 10 through a pivot pin 14. As indicated in FIG. 6, a crank shaft 15 drives the crank arm 13 which in turn actuates the drive lever 10 pivoting it about the vertical pin member 11.

In addition, a second drive lever 19 is mounted about the pin member 11 and serves to reciprocate the lower blade 21. At its opposite end the drive lever 19 is also secured to the crank shaft 15 by means of a crank arm 17 and a crank pin 16.

The front portions of the drive levers extending from the pivot axis 11 to the blade heads 2, 22 are approximately as large at their centers as blade guide arms 26. This ensures uniform motion of the entire blade along the segment of an arc.

The mounting of lower blade 21 and its blade head 22 in a bearing piece 20 and the locking of the blade head by means of an adjusting bolt 23 corresponds to the manner in which the upper blade 1 is attached to the drive lever 21 through the bearing member 3, as seen in FIG. 5.

The radii for crank arms 13 and 17 must be selected so that the upper and lower blades 1, 21 execute the same stroke. Thus, in the example illustrated, the radius of the crank arm 17 for drive lever 19 reciprocating lower blade 21 must be greater than that of crank arm 13 since drive lever 10 on the blade side has a longer lever arm than the drive lever 19.

The crank shaft 15, as shown in FIG. 6, can be driven in various ways, for example, by means of a take off shaft from a tractor employing a mechanical or a hydraulic drive or by an electric motor. Crank shaft 15 can be placed horizontally, for example, if the necessary room is available in the case of side reapers or if this appears to a more satisfactory manner in which to arrange the drive means. In the arrangement illustrated all that is necessary would be to mount pivot pins 14 and 16 in ball joints or the like so that with the crank shaft horizontal, the change in position of the drive lever can be compensated for in addition to the setting angle of the connecting rods.

Due to the freedom from play and the low wear in the joint for mounting the lower blade on the drive lever by means of the bearing piece any friction on the bearing surface of the blade or parts of the drive shoe B is kept as low as possible since a certain air gap is present. This reduces both friction and heating any individual parts.

For purposes of saving weight, the drive levers 10 and 19 can be formed of hollow sections thus keeping the reciprocating masses small.

In the region of the drive shoe B the back 25 of the beam, see FIG. 4, is offset rearwardly to provide an appropriate free space for the connection between the lower drive lever 19 and the lower blade 21.

As shown in FIGS. 2 and 4, the pipe section 30 serves to connect the reaper apparatus A to a prime mover and can be secured within the shoe B by means of an appropriate joint 40. To reduce the bending loads still further, as shown in FIG. 7, the effective lines 334 and 335 of the drive forces extend from the axes of the connections between the blades and the drive levers to the center of gravity of the blades. For practical purposes, this arrangement eliminates any unwanted additional torque in reciprocating the reaper blades.

From the foregoing description it can be appreciated that it is of considerable importance that the pins 5 and 31, which form the pivotal axes for the upper and lower drive levers, are parallel with the pivot axis 11 so that no appreciable bending stresses can occur.

The drive levers 10 and 19 can be mounted on the pin member 11 in a rigid manner, for example by means of precision needle bearings or high quality sliding bearings and since these bearings can be sealed dust tight, a long lifetime is ensured so that the drive levers can guide the reaper blades satisfactorily in an arc segment.

In addition, all the bearings can be lubricated so that in operation a certain amount of the lubricant is forced out of the bearing thus preventing dirt from entering and causing any considerable amount of wear. Accordingly, impact loading of worn dry parts is eliminated even at high drive velocities and high mass forces.

In FIGS. 4 and 7, the end tooth 27 on the upper blade 1 and the end tooth 28 on the lower blade 21, adjacent the drive levers, extend forwardly more than the remaining teeth on the blades. This arrangement of the end teeth 27, 28 compensates for the partial covering of the normal cutting area of the teeth by the drive parts. As a result, a full cutting area is assured for these teeth and this is important because inner wall 18 of shoe B passes a relatively large amount of the material to be reaped into the cutting areas of these end teeth.

In the case of blades which are driven at the ends it is of particular advantage to locate the drive levers as far as possible toward the outside of the arrangement and behind the ends of the blades so that the crank shaft 15 can be situated at least partly in the space defined laterally by the wall of the shoe which runs rearwardly and somewhat obliquely inwardly from the blade section. In the embodiment illustrated, both the shoe which contains the drive and the other shoe which does not contain any drive have the same outer contour so that the shoes may be driven directly into the material to be reaped without any trouble.

Resilient pressure may be applied to the upper blade by arranging its drive lever 10 to be axially displaceable on the pin member 11 and to be biased downwardly. An additional compression spring 41, for this purpose, is shown in FIG. 11.

In another embodiment of the invention, as shown in FIG. 8, a drive lever 10a for reciprocating the upper blade is made very flat particularly in front adjacent the cutting area so that jamming of the reaped material is avoided to a considerable degree and, in the case of center drives, assistance is provided in parting the swath. Blade drives of this type are normally employed on reaper blades whose drive means is located at the center of the blade beam between its ends. In such drives, the lower blade is held free of play in the drive area only by means of the lower drive lever 19a. A drive head 32 is attached to the blade and rearwardly of the blade supports a pin 33 around which a ball bearing 34 is permanently attached with the drive lever 19a secured to the outer race of the ball bearing. Rearwardly from its point of attachment to the ball bearing, the drive lever 19a has a generally horizontally pivot pin 35 which is mounted in the carrier part of the drive lever and is arranged to pivot to a limited degree. By means of this two piece arrangement it is possible for drive lever 19a reciprocating the lower blade 21 to follow the oscillation of the cutter mechanism resulting from irregularities in the ground since the mechanism can oscillate about the axis of the pivot pin 35. The ball bearing 34 is a journal and thrust bearing and, therefore, lower blade 21 does not have any uncontrolled motion in its drive parts.

In this same construction, a drive lever 10a for the upper blade is formed of two parts, a front part 36 is connected to a rear part 38 by means of a hinge pin 37. The desired resilient pressure loading on the upper blade 1 is attained by means of a tension spring 39 connected to front part 36 at a position offset an appropriate distance from the hinge pin 37.

At the forward end of the upper drive lever 10a a front hinge 42, in the form of a ball joint, transfers the reciprocating motion from the drive lever to the upper blade and also equalizes the oscillating motion of the cutter mechanism. The center of this front hinge 42 is located approximately over the center of the length of the reaper blade teeth so that the resilient pressure ensures satisfactory bearing of the upper blade 1 on the lower blade 21.

In FIG. 9, another embodiment of the invention, for adapting to ground irregularities parallel to the direction of travel of the reaper apparatus, is shown. This embodiment is arranged to pivot freely, to a certain extent, about an axis pointing in the direction of travel of the apparatus. Accordingly, above the pivot member, an end carrier pin 43 is mounted within retaining elements 44 secured to the pipe section 30 and within retaining elements 45 secured to the shoe. Deflection is limited in both directions by means of appropriate stops not shown in the drawing. The center line or axis of the carrier pin 43 extends through the center of the rear drive joint of the levers so that no distortion occurs when the cutter mechanism oscillates.

The arrangement of the drive lever for the blade is similar to that described above. In front of the cutting area of the blade a small sharp point 46 is positioned so that no reaping material or other contaminant can adhere to it. To the rear and somewhat above the point 46 is a so-called separator 47.

In FIG. 10, a pin member 11a of substantial size provides a solid pivot axis for the drive lever and provides a connection to the carrier 48 for the shoe. By means of this arrangement, it is possible for the reaper drive to be very narrow leaving as much room as possible for depositing the swath of reaped material. This arrangement is particularly suitable for small front reapers.

In FIG. 11, mentioned above with regard to the resilient construction of the pivot axis, a single blade cutter arrangement is formed by a back up blade 49 against which a moving blade 50 is supported. Compression spring 41 acts at its lower end, against an axial thrust washer mounted on the drive lever 52 and, at its upper end, is in contact with a fixed protective cap 53. By this spring arrangement, a constant loading is provided on the drive lever in a downward direction which, in cooperation with its weight, causes the blade 50 to rest securely on the back up plate 49. To compensate for wear and manufacturing inaccuracies drive lever 52 is displaceable, to a limited extent, on the pivot axis 54 so that the drive lever and its associated blade always moves downwardly against the back up blade.

In the embodiment illustrated in FIGS. 12 to 14, the upright pivot axis 56 for the drive levers 57 and 58 which reciprocate the corresponding upper and lower blades is held in a drive shoe 55. In addition, hinge bolts 59 are positioned within the shoe. Two crank arms 61 mounted on a crank shaft 62 supported within bearings 63 and 64 are secured through ball joints to the drive levers 57, 58. The crank shaft 62 can be driven by means of a V-belt pulley 65 or in any other known manner. Moreover, the drive arrangement, as viewed from the direction of travel of the reaper, is disposed in front of the blades and, alternatively, may be disposed behind the blades.

The particular advantage of this drive arrangement, in addition to the main concept of the invention, is that the ball joints 60 for the blades are fairly close together and the crank shaft is arranged in coaxial relationship with hinge pins 59. The drive can be satisfactorily supplied by means of a V-belt pulley 65 without any distortion arising from pivoting about hinge pins 59. Arms 66 form a portion of the so-called claw piece of the reaper apparatus and do not form a part of the invention. In a known manner, the crank arms 61 could be attached to the drive levers 57, 58 and accommodated with the drive shaft in a location above the area of contamination.

What is claimed is:

1. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured to said bearing member and disposed in spaced and parallel relationship with said first pin, said drive lever having a bore adjacent one end thereof, said second pin disposed within the bore in said drive lever forming a hinge joint free of play with said second pin, said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, said means for resiliently urging said blade comprising said drive lever forming a chamber at the upper end of the bore therethrough, a collar mounted on said second pin and disposed within the chamber, an extension member extending axially upwardly from said second pin, and a helical spring disposed about said extension member within said chamber and acting at its upper end against said drive lever and at its opposite end against said collar for resiliently urging said bearing plate downwardly through the medium of said second pin.

2. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured to said bearing member and disposed in spaced and parallel relationship with said first pin, said drive lever having a bore adjacent one end thereof, said second pin disposed within the bore in said drive lever forming a hinge joint free of play with said second pin, said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, said means for resiliently urging said blade comprising a cap member mounted on the upper end of said first pin, a compression spring mounted about said first pin and acting at its upper end against said cap and its lower end against said drive lever for urging said drive lever downwardly and in turn urging said blade downwardly mounted on the end of said drive lever.

3. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured ot said bearing member and disposed in spaced and parallel relationship with said first pin, said drive lever having a bore adjacent one end thereof, said second pin disposed within the bore in said drive lever forming a hinge joint free of play with said second pin, said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, a drive housing, said means for driving said blade disposed within said housing, said housing having its forward end in the direction of travel of the reaper cutter mechanism located forwardly of said blade and extending rearwardly and obliquely inwardly therefrom, said drive housing being located at one end of said blade, and a similarly constructed housing mounted at the opposite end of said blade for affording an end support for the blade.

4. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured to said bearing member and disposed in spaced and parallel relationship with said first pin, said drive lever having a bore adjacent one end thereof, said second pin disposed within the bore in said drive lever forming a hinge joint free of play with said second pin, said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, a second blade disposed below said reaper blade, means for supporting said second blade which in turn supports said downwardly resiliently biased reaper blade, said second blade being arranged to reciprocate oppositely to said other reaper blade for providing the reaping action, a second drive lever for said second blade, said second drive lever being mounted on said first pin, a fourth pin disposed in spaced parallel relationship with said first and second pins, a bearing member secured to said second blade, said fourth pin being affixed to said second bearing member, said second drive lever having a bore therein in parallel relationship with said first pin, said fourth pin being fitted within said bore.

5. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured to said bearing member and disposed in spaced and parallel relationship with said first pin, said drive lever having a bore adjacent one end thereof, said second pin disposed within the bore in said drive lever forming a hinge joint free of play with said second pin, said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, a second blade disposed below said reaper blade, means for supporting said second blade which in turn supports said downwardly resiliently biased reaper blade, said second blade being a stationary back blade upon which said reaper blade rests.

6. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured to said bearing member and disposed in spaced and parallel relationship with said first pin, said drive lever having a bore adjacent one end thereof, said second pin disposed within the bore in said drive lever forming a hinge joint free of play with said second pin, said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, a drive housing, said means for driving said blade disposed within said housing, and a pipe section disposed in parallel relationship with said first pin and secured to said housing for supporting said means for driving said blade and said housing from a prime mover.

7. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured to said bearing member and disposed in spaced and parallel relationship with said first pin, said drive lever having a bore adjacent one end thereof, said second pin disposed within the bore in said drive lever forming a hinge joint free of play with said second pin, said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, said drive lever comprising a first part secured to said blade and a second part secured to said first pin, a pin member having its axis disposed substantially perpendicularly to the axis of said first pin interconnecting said first and second parts of said drive lever, and a spring member connected to said second part and to said first part at a position spaced from said pin for spring loading said drive lever.

8. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured to said bearing member and disposed in spaced and parallel relationship with said first pin, said drive lever having a bore adjacent one end thereof, said second pin disposed within the bore in said drive lever forming a hinge joint free of play with said second pin, said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, a drive housing, said means for driving said blade disposed within said housing, a support member, a pair of retaining elements secured to said support member, a pair of retaining elements secured to said housing, and a pivot pin mounted in said support elements on said support member and said housing said pivot pin extending transversely of said first pin, said pivot pin arranged to provide limited pivotal movement of said reaper cutter mechanism in its direction of travel.

9. A device for driving a reaper cutter mechanism comprising at least one reciprocating reaper blade, means for driving said blade comprising a vertically extending first pin, a drive lever arranged to pivot about said pin, a bearing member secured to said blade, a second pin fixedly secured to said bearing member and disposed in spaced and parallel relationship with said first pin, said drive lever having a bore adjacent one end thereof, said second pin disposed within the bore in said drive lever forming a hinge joint free of play with said second pin being axially displaceable within said bore whereby as said drive lever pivots about said first pin the connection between said drive lever and said second pin through said bearing member imparts the reciprocating action to said blade, means adapted for resiliently urging said blade against a cooperating support member in carrying out the reaping action, a second blade disposed below said reaper blade, means for supporting said second blade which in turn supports said downwardly resiliently biased reaper blade, a crank shaft disposed laterally of and extending forwardly from said first and second blades, and crank arms extending from said crank shaft and secured to said first and second levers by ball joints, the axis of said crank shaft extending substantially perpendicularly of the axis of said first pin.

10. A device, as set forth in claim 1, wherein means disposed between said bearing member and said drive lever for forming a seal for the joint therebetween.

11. A device, as set forth in claim 4, wherein each of said blades having a plurality of teeth extending across the said blades, said teeth extending forwardly from said blades, an end tooth located at the end of each said blade adjacent said drive levers, said end teeth having a greater length extending forwardly from said blade than the length of the remaining teeth on said blade.

12. A device, as set forth in claim 11, wherein a blade beam extending in parallel relationship with said blades and on the opposite side thereof from said teeth thereon, and said back being offset rearwardly from said blade adjacent said drive levers.

13. A device, as set forth in claim 4, wherein said second drive lever for said second blade comprises a first section connected to said blade, a generally horizontally arranged pin extending rearwardly from said first section, a second section of said second lever mounted on said first pin, said horizontally arranged pin being supported within said second section and being arranged to pivot therein to a limited extent for adapting to ground irregularities over which said reaper apparatus travels.

14. A device, as set forth in claim 13, wherein said bearing member connected to said second blade comprises a part connected to said blade, a ball bearing stationarily connected to said part, and said first section of said second drive lever being fixed to said bearing.

References Cited

UNITED STATES PATENTS

| | | | |
|---|---|---|---|
| 2,691,863 | 10/1954 | Krause | 56—296 |
| 2,664,690 | 1/1954 | Huddle et al. | 56—297 |
| 2,850,864 | 9/1958 | Rohweder | 56—296 |
| 2,824,416 | 2/1958 | Orelind | 56—296 |

RUSSELL R. KINSEY, Primary Examiner